US008522039B2

(12) United States Patent
Hyndman et al.

(10) Patent No.: US 8,522,039 B2
(45) Date of Patent: Aug. 27, 2013

(54) METHOD AND APPARATUS FOR ESTABLISHING A FEDERATED IDENTITY USING A PERSONAL WIRELESS DEVICE (75) Inventors: Arn Hyndman, Ottawa (CA); Nicholas Sauriol, Kanata (CA)

(73) Assignee: Apple Inc., Cupertino, CA (US)

( * ) Notice: Subject to any disclaimer, the term of this patent is extended or adjusted under 35 U.S.C. 154(b) by 1901 days.

(21) Appl. No.: 10/863,946

(22) Filed: Jun. 9, 2004

(65) Prior Publication Data

US 2005/0278547 A1 Dec. 15, 2005

(51) Int. Cl.
H04L 9/32 (2006.01)

(52) U.S. Cl.
USPC .......................................................... 713/185

(58) Field of Classification Search
USPC .......................................................... 713/185
See application file for complete search history.

(56) References Cited

U.S. PATENT DOCUMENTS

| | | | |
|---|---|---|---|
| 5,239,294 A | 8/1993 | Flanders et al. | |
| 5,301,234 A | 4/1994 | Mazziotto et al. | |
| 5,661,806 A | 8/1997 | Nevoux et al. | |
| 5,754,654 A | 5/1998 | Hiroya et al. | |
| 5,757,917 A | 5/1998 | Rose et al. | |
| 5,894,249 A * | 4/1999 | Kuwabara ..................... | 332/103 |
| 5,907,616 A | 5/1999 | Brogger et al. | |
| 5,943,620 A | 8/1999 | Boltz et al. | |
| 5,943,624 A | 8/1999 | Fox et al. | |
| 6,128,509 A | 10/2000 | Veijola et al. | |
| 6,175,922 B1 | 1/2001 | Wang | |
| 6,223,166 B1 | 4/2001 | Kay | |
| 6,277,026 B1 | 8/2001 | Archer | |
| 6,584,309 B1 | 6/2003 | Whigham | |
| 7,103,572 B1 | 9/2006 | Kawaguchi et al. | |
| 7,209,903 B1 | 4/2007 | Mamdani et al. | |
| 2001/0034720 A1 | 10/2001 | Armes | |
| 2002/0038459 A1 * | 3/2002 | Talmola et al. ................. | 725/81 |
| 2003/0092425 A1 * | 5/2003 | Okazaki et al. ............... | 455/411 |
| 2003/0126017 A1 * | 7/2003 | Rau et al. ......................... | 705/16 |
| 2003/0149781 A1 * | 8/2003 | Yared et al. ................... | 709/229 |
| 2003/0210678 A1 * | 11/2003 | Haukka ......................... | 370/352 |
| 2004/0203846 A1 * | 10/2004 | Caronni et al. ............ | 455/456.1 |
| 2005/0165695 A1 * | 7/2005 | Berardi et al. .................. | 705/64 |

OTHER PUBLICATIONS

"Wireless Application Protocol;" WapTiger—WAP standard, retrieved from <http//www.waptiger.com/wapstandard.html> on Apr. 15, 2004, Copyright 2000-2003 Infotiger; pp. 1-2.

(Continued)

Primary Examiner — Cordelia Zecher
(74) Attorney, Agent, or Firm — Meyertons, Hood, Kivlin, Kowert & Goetzel, P.C.

(57) ABSTRACT

A federated identity, established through possession of a single sign-on token, will allow a personal wireless device (PWD) to be used in a commercial environment to purchase goods or services, access a building, access a telephone, wireless, or computer network, or in numerous other instances. The token may be obtained by the user authenticating with the PWD and the PWD authenticating with the network. When the PWD comes within range of a service provider, a session is established using a short range wireless protocol, such as Bluetooth or infrared. The session is secured using a security protocol such as SSL, and the service provider authenticates its identity to the PWD. Policy may be implemented regarding transmission of the token to the service provider. Upon receipt of the token, the service provider will validate the token with the federated identity provider, obtain identifying information, and complete the transaction.

30 Claims, 2 Drawing Sheets

(56) References Cited

OTHER PUBLICATIONS

"If the Milk in the Fridge Turns Sour Blame the Mobile;" Financial Times Group, FT.com, Jun. 27, 2000; p. 1.

D. Graham-Rowe, *Cellphone allows users to swipe and go*, Dec. 16, 2003, (1 page).

R. Pinheiro, *Strong User Authentication for Electronic and Mobile Commerce*, GSEC Version 1.4 (15 pages), Dec. 16, 2003.

Liberty Alliance, *Introduction to the Liberty Alliance Identity Architecture*, Revision 1.0, Mar. 2003 (14 pages).

D. Hennessy, *The value of the mobile wallet*, Dec. 2003, (20 pages).

\* cited by examiner

METHOD AND APPARATUS FOR ESTABLISHING A FEDERATED IDENTITY USING A PERSONAL WIRELESS DEVICE

BACKGROUND OF THE INVENTION

1. Field of the Invention

The present invention relates to identity management and, more particularly, to a method and apparatus for establishing a federated identity using a personal wireless device.

2. Description of the Related Art

A person's identity is used in numerous contexts to enable the individual to obtain services and obtain goods. For example, the person's identity may be established by a credit card issued by a credit service to allow the person to obtain goods or services from a merchant. Similarly, the person's identity may be established by possession of a key to enable the person to obtain access to their car or house. On a computer network, a person's identity may be established through the use of an user identification code and password.

As technology has developed, the management of identity has become more intricate. For example, a given person may have an account at tens or hundreds of on-line merchants, may have multiple credit cards and bank cards, codes to enable them to sign on to their mobile telephone or personal digital assistant, and codes to enable them to obtain access to one or more computer networks. Management of all this information becomes increasingly complicated as the number of identities and the number of forms of identification increase.

Limited attempts have been made by individual merchants to facilitate transactions by allowing customers to purchase goods/services without providing identification information at the point of sale. For example, several fuel companies have implemented a system in which the customer is issued a payment device, such as a wand, that may be placed in the vicinity of a gas pump owned by a franchise station to cause the gas pump to activate to dispense gas to the customer. The wand may also be used inside an associated convenience store and allows a user to purchase gasoline and other supplies at the franchise station without requiring the user to find cash or a credit card. While the wand may make transactions with that particular service provider more convenient, the wand may not be used at other merchants and is thus only useable to obtain goods and services from the merchants associated with the parent company that issued the payment device.

As a result of the increasing complexity of identity management, a concept of federated identity was developed to simplify management of identity in a computer environment. Specifically, on a computer network, a federated identity enables a user to establish an identity once and use that identity with other service providers that have created a circle of trust. Essentially, the federated identity allows a user's identity to be established with one service provider and used at other service providers. Additionally, the identity may remain anonymous such that the service provider knows the customer is authorized to access the services, but may have no information about the individual that is able to be related to the customer's actual physical identity. Conventionally, the federated identity concept has been used only with computer networked services to allow a user to sign on to one computer system and, using that established identity, obtain access to other network systems even where the other network systems were not related to or owned by the first system.

Identity management in the real world is just as important as in an on-line context, since theft of credit card numbers and other identifying information costs merchants and consumers billions of dollars each year. Additionally, requirements associated with providing identification information while transacting with service providers provide an additional barrier to increasing transactions. This is particularly true in certain industries, such as rental industries, where the service providers routinely require the customer to fill out one or more lengthy forms. Accordingly, it would be advantageous to provide a way for a federated identity to be used in a secure manner in an environment other than on a computer network.

SUMMARY OF THE INVENTION

The present invention provides a method and apparatus for establishing a federated identity with a personal wireless device. According to an embodiment of the invention, a personal wireless device may be used to establish a federated identity in an environment other than when connected to a conventional computer network in a circle of trust associated with that federated identity provider. For example, a customer may use the federated identity to purchase goods or services, to access a building, to access a telephone, wireless, or computer network, or in numerous other instances where the customer would ordinarily establish an identity using something possessed or known by the user, such as a credit card, identification card, and/or password and secret code. The token may be obtained from a federated identity provider automatically when the wireless communication device establishes connectivity on the wireless network, and used for a period of time. When the personal wireless device comes within range of a service provider, the personal wireless device establishes a session using a short range protocol, such as Bluetooth, infrared, or one of the 802.11x protocols. The session is secured using a security protocol such as SSL, and the service provider authenticates its identity to the personal wireless device. Where the service provider is new to the personal wireless device, the personal wireless device prompts the user for authorization to pass the user's token to the service provider. Where the service provider is known, policy may be applied regarding when and to which service providers a token automatically should be passed. Upon receipt of the token, the service provider will validate the token, obtain whatever identifying information is required from the federated identity provider, and perform the service to the customer. Optionally, other information may be passed from the personal wireless device to the service provider along with or instead of the token, such as an user's customer number or other information, that may allow the user to be identified to the service provider in a manner proprietary to that service provider.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
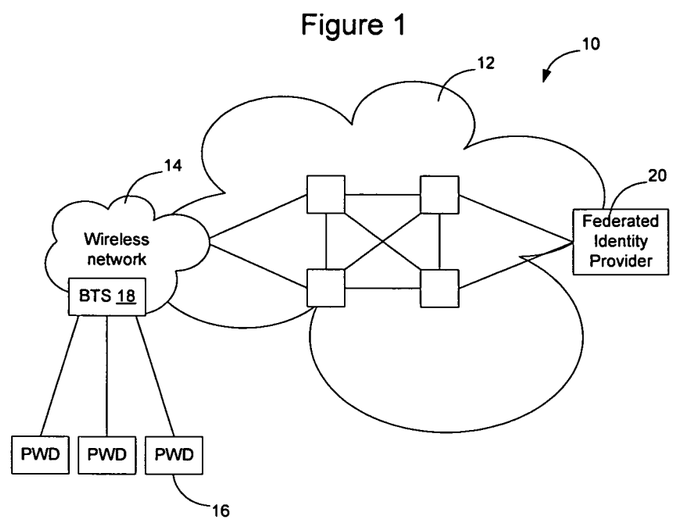
FIG. 1 is a functional block diagram of a communication network that may be used to establishing a federated identity with a personal wireless device to facilitate transactions according to an embodiment of the invention.

FIG. 1 illustrates a communication network 10 including a wireline portion 12 and a wireless portion 14. Wireless signals from personal wireless devices 16 are received at one or more base transceiver stations 18 on the wireless network 14 and transferred on the wireless network or wireline network 12 to an intended recipient. For example, the wireless and wired networks may be used to interface the user to a federated identity provider 20 on the network 10. Although the federated identity provider has been illustrated as attached to the wireline portion of the network 10, the invention is not limited in this manner as the federated identity provider may be located anywhere on the network 10, including the wireless portion of the network 14.

As discussed in greater detail below, authentication of the user to the personal wireless device and authentication of the PWD on the wireless network allow the user to be authenticated to the federated identity provider to cause a single sign-on token to be issued to the user and stored in the personal wireless device. The token may allow the personal wireless device to be used in an environment other than when connected to a conventional computer network. For example, to allow the user to:

- engage in transactions with service providers such as merchants;
- obtain access to a building, vehicle, or other controlled space;
- obtain admittance to a concert or sporting event;
- obtain goods from a vending machine or kiosk;
- obtain money from an automatic bank machine;
- verify the user's age in connection with the purchase of restricted substances such as tobacco or alcohol;
- make a telephone call;
- interface a telephone answering service or other telecommunications service;
- obtain access to a wireless network such as an 802.11x network with which the user does not have an account;
- obtain goods or services in an environment where the user would conventionally be required to present a credit card or identification card.

The federated identity may be used in numerous other instances as well and the invention is not limited to the manner in which the federated identity is used outside of a conventional computer network environment.

Figure 2:
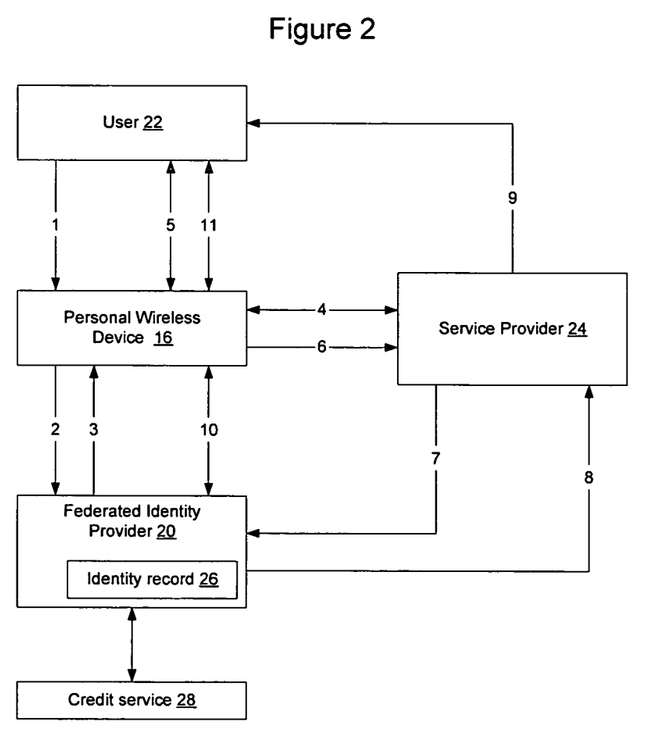
FIG. 2 is a functional block diagram illustrating a process for establishing a federated identity with a personal wireless device and engaging in a transaction using the federated identity according to an embodiment of the invention.

FIG. 2 illustrates a process in which an user 22 is able to obtain goods or services from a service provider 24 such as a merchant through the use of a federated identity. As shown in FIG. 2, initially the user authenticates with a personal wireless device 16 to prove to the personal wireless device that the user is the owner or authorized user of the personal wireless device. (arrow 1). The personal wireless device may be a cellular telephone, personal digital assistant, pager, portable e-mail device, GPS, watch, camera, or another electronic device configured to participate in wireless transmissions and which is small enough and portable to be conveniently carried by the user.

Authentication by the user may involve passing information from the user to the personal wireless device, such as entering an user ID and password. This type of authentication relies on something the user knows to authenticate the user to the personal wireless device. Another form of authentication may rely on something the user possesses to establish the authentication, such as requiring the user to interface another mechanical or electronic device to the personal wireless device, such as an RFID tag, an electronic card, or key, to prove to the personal wireless device that the user is authorized to use the personal wireless device. Another type of authentication may rely on something the user is, rather than what the user knows or has. One conventional type of authentication of this nature involves biometrics, such as voice-print identification, thumbprint identification, or other types of biometric identification. A combination of these types of authentication may be used as well and the invention is not limited to the particular manner selected to authenticate the user to the personal wireless device.

As part of the authentication process, the personal wireless device may authenticate with the wireless network (arrow 2) in a conventional manner. For example, cellular telephones are required to go through an initialization process when the cellular telephone is turned on and begins to monitor signals on the network or engage in communications on the network. The authentication and authorization processes in the cellular space are well established and may be used in this context, optionally in combination with the user authentication procedure described above, to authenticate the user and personal wireless device.

Once the personal wireless devices authentication process has been completed, the credentials are passed from the personal wireless device to the federated identity provider to authenticate the user and personal wireless device to the federated identity provider. Optionally, the federated identity provider 20 may require a second authentication, such as the submission of a password or authentication by one of the other mechanisms discussed above.

In this process, it has been assumed that the user has a federated identity that has been established with the federated identity provider, and that the personal wireless device has been associated with that identity, for example when the personal wireless device was obtained, e.g. from the cellular service provider. Thus, establishing the identity of the personal wireless device may be used to verify to the federated identity provider the identity of the user. If the user doesn't have a federated identity at the federated identity provider, additional authentication and information transmissions may be required before the federated identity provider will issue a token to the user. Once this information has been provided and the user then has an identity record at the federated identity provider, the user may obtain a federated identity token in subsequent transactions by providing authentication credentials to the personal wireless device, as discussed in greater detail herein.

The federated identity provider 20, once satisfied with the authentication process, returns a token (arrow 3) which is stored in the personal wireless device for future use. A token is a code, for example roughly 100 bytes in length, although shorter or longer codes may be used as well and the invention is not limited to use with a token of any particular length. The token contains a reference to an identity record 26 at the federated identity provider which may contain numerous aspects of information about the customer and may be established when the customer creates a federated identity and updated as necessary. For example, the identity record may contain the customer's name, address, telephone number, social security number, and many other aspects of the customer's identity. Alternatively, the identity record may contain references to other identity repositories containing aspects of the customer's identity to enable the federated identity provider to obtain the requisite information as required.

The use of tokens and the manners in which tokens may be generated, issued, and used, are well known in a computer network context. According to an embodiment of the invention, a token may be stored in an users personal wireless device and used in other contexts such as in a commercial environment, to obtain goods and services. Since tokens themselves are well known entities, however, additional details on specific token systems will be omitted as numerous types of tokens may be used in connection with the invention. Thus, the invention is not limited to any particular token generation system or token format, as numerous types of tokens and token generation methods may be used.

The token, once generated, is passed to the personal wireless device to allow the personal wireless device to be used to purchase goods and services from merchants associated with the circle of trust for the federated identity provider Once, an user has obtained a token, it may use that token for a period of time until the token expires, or for a particular transaction or series of transactions. The token may be used to establish the customer's identity in a circle of trust of a federated network of merchants so that the user does not need to reestablish its identity with merchants that are associated with the circle of trust for that federated identity provider. The token may be used to obtain goods and services from service providers, obtain access to restricted areas, and for many other purposes as discussed in greater detail above. The invention is not limited to the use of a token in a particular type of transaction.

When a user comes within range of a service provider 24, the personal wireless device and/or the service provider terminal will sense the ability to form a connection and will establish a session (arrow 4). Several examples of protocols that may be used to establish a communication session include Bluetooth, which is defined by IEEE standard 802.15.1, one of the IEEE 802.11x protocols, short range infra-red transmissions, and other short range transmission protocols, although the invention is not limited to any particular protocol.

For example, many available cellular telephones are Bluetooth enabled, meaning that they have the ability to communicate using the Bluetooth protocol as well as one or more conventional cellular protocols. The Bluetooth enabled personal wireless device may sense that it is able to make a connection with another Bluetooth enabled device such as a merchant terminal. Accordingly, the personal wireless device and the merchant terminal will establish a session for that user. The session will remain active while the personal wireless device is within range of the merchant terminal and the two devices are able to communicate. When the personal wireless device moves out of range of the merchant terminal, the session will be automatically terminated and not be able to be used by other Bluetooth enabled personal wireless devices. The session may be terminated by the user as well, for example upon completion of a transaction. The personal wireless device may engage in several sessions simultaneously, and the invention is not limited to a single session as illustrated in FIG. 2, which was simplified to illustrate the concepts associated with the invention.

Once a session has been established, a secure channel will be built on the session. This may be done in a number of different ways, but in one embodiment is implemented using a security protocol such as Secure Socket Layer (SSL), which is a conventional security protocol and used extensively in wireless transmissions. Use of a secure channel enables the service provider to authenticate itself to the personal wireless device to allow the personal wireless device to determine the identity of the service provider associated with the session.

An user may not wish to provide every service provider with its token. Once the service provider's identity is established, via an appropriate signature or authentication procedure, policy may be applied to determine whether the service provider should be provided with the user's token. For example, if the service provider is unrecognized, the user may be prompted to determine if the user would like to provide the service provider with its token. If the service provider is recognized, the user may set policy associated with the recognized service providers to always provide the service provider with the token, always prompt the user before transmission of the token to the service provider, or take other action with respect to a particular service provider. For example, an user may set a policy that the token should always be passed to the user's automobile to cause the automobile to unlock when the personal wireless device is within range of the automobile, and to lock the car when the personal wireless device is out of range. Alternatively, the user policy could be that the user is always to be prompted before transmission of the token. For example, a user may not want its token to be passed to an ATM machine as the user walks past if the user does not want to stop at the ATM machine.

Where the policy is such that transmission of the token is not automatic, the user may be prompted to determine whether the user would like to transfer the token to the service provider. The user may be queried by an audio prompt, tactile prompt such as vibrations, and/or via a visual prompt. According to one embodiment of the invention, the personal wireless device may maintain a list of service providers that currently have active sessions with the user via the personal wireless device and allow the user to select one or more of the sessions to receive the token. For example, as an user walks through an airport, the user may pass a row of kiosks, an ATM, twelve vending machines, several stores, an information booth, and several ticket counters. Each of these service providers may have an active session with the personal wireless device and multiple of the sessions may be active at any given time. Allowing the user to select from between the several sessions allows the user to interact with the particular service provider of its choosing.

The information transmitted to the personal wireless device from the service provider may contain information sufficient to allow the user to identify the service provider and the particular terminal associated with that service provider. The additional information allows the user to select between different terminals as well as between service providers. Policy may be stored on a per terminal basis as well as a per service provider basis, although the invention is not limited to this embodiment.

Other information may be used to help identify to the user the particular terminals available for transactions. For example, the signal strength may be used to determine which terminal is closest to the personal wireless device, so that that terminal may be listed first in the list of available terminals.

Other mechanisms may be used as well, and the invention is not limited to the particular manner in which terminals are identified.

Where the personal wireless device supports multiple communication technologies, such as both Bluetooth and infrared, the user may set policy between the various available communication technologies to specify that particular service providers may only obtain a token from the personal wireless device over infrared while others may obtain a token via Bluetooth. For example, the user may not want to ever pass its token via Bluetooth to a bank ATM and may require the transaction with the bank ATM to occur via infrared. Similarly, the user may elect to use a point (using infrared) and click (using buttons on the phone) to select a session from a particular terminal that is equipped to operate using infrared communications. Other ways of selecting from between sessions and selecting policy may be used as well and the invention is not limited to these several described examples.

When the user selects whether to provide a token to the service provider, it may select policy at the same time to be applied to that service provider. Thus, for example, the user may be prompted to determine whether it would like to provide the token to the service provider once, all the time, or be prompted every time.

Transmission of the token may occur automatically when the user comes within range of the terminal, or may occur only upon performance of a particular action by the customer, such as depression of a button on the cellular telephone, touching the cellular telephone to a portion of the terminal, aiming the cellular telephone at the terminal, or in another way to indicate an intent on the part of the customer to transmit the token to the terminal. For particularly important transactions, transmission of the token may require the user to input a user ID and password to reauthenticate the user to the personal wireless device before allowing the personal wireless device to be used in a high value financial transaction. Additionally, to complete the high value transaction, e.g. with an ATM, the user may be required to input a password to the ATM as is currently required by conventional bank ATM machines.

Optionally, other information may be passed to the service provider in addition to the token, prior to transmission of the token or according to a different set of policy rules. For example, grocery stores and other merchants commonly issue customer loyalty cards that may contain a bar-coded identification to enable the users to obtain discounted food in exchange for allowing the store to track their spending habits and food purchasing habits. Customer identification information of this nature may be provided, as set by user policy, for select service providers separate from the policy as to whether to pass the token to the service provider. Alternatively, this information may be stored as part of the user's identity record at the federated identity provider. Policy associated with the identity record may specify that this information should be passed to particular service providers when the service providers present the federated identity provider with the token. In this manner, service provider specific information may be stored in the user's identity record and selectively presented to service providers per the user's policy, which is also stored as part of the identity record.

If the user determines that it would like to interact with the service provider, as specified to the personal wireless device via preconfigured policy or through action by the user such as by depression of a button on the personal wireless device, the personal wireless device will transmit the token to the user (arrow 6). The service provider will validate the token (arrow 7) and collect whatever information is required about the user from the federated identity provider (arrow 8). Validation of the token and the manner in which information is supplied to the service provider are well known aspects of federated identity systems and the invention is not limited to a particular implementation. Once the token is validated and the service provider has the required identifying information, the service provider will provide the goods/services to the user.

Once the token has been passed to the merchant, the merchant passes the token to the federated identity provider 20 (arrow 7). The merchant may also pass information about the transaction and an indication of what type of information the merchant requires to process the sale. For example, the merchant may pass an amount of the sale to the federated identity provider with a request for an indication that the customer has been approved by a credit service 28 to proceed with the sale. The federated identity provider, using the identity information associated with the token stored in the identity record 26, may interface with the credit service 28 to obtain approval for the sale, and then pass the authorization code and any required identification information back to the merchant (arrow 8). Alternatively, the federated identity provider may provide credit information back to the service provider to allow the service provider to interface with the credit service directly.

For example, the federated identity provider may be requested by the merchant to provide an indication of the customer's ability to pay for the requested goods/services, a reference to a payment made to the merchant's account, and other information associated with the financial aspects of the desired transaction. Where the merchant requires additional information, such as the customer's contact information, that information may be passed as well.

Optionally, after the token is passed to the merchant, the federated identity provider may confirm with the personal wireless device (arrow 10) and/or user (arrow 11) that the user wishes to engage in a transaction with the service provider. The user may set policy associated with whether it would like to confirm transactions with the federated identity provider such that the user or personal wireless device is prompted for confirmation whenever the transaction exceeds a particular amount, for transactions with particular sets of service providers, or in any other number of ways. The invention is not limited to the policy implemented regarding confirmation of transactions.

For example, the federated identity provider may pass a message to the customer's personal wireless device requesting the customer to confirm that they would like to engage in the transaction. By pressing a particular button or entering a particular code the customer may confirm their intent to engage in the transaction. Additionally, by requiring the customer to enter a code, an additional level of security may be injected into the process. Specifically, requiring entry of a secret code may help to ensure the same customer that was provided with the token is still in possession of the personal wireless device and that the personal wireless device has not been lost or stolen. Absent a response, the transaction may time out if no response is received within a particular period of time.

Interactions with a service provider are session based which, according to an embodiment of the invention, requires the connection (session) with the service provider to be maintained during for the duration of the transaction. If the session is terminated, for example if the user walks away from the service provider and removes the personal wireless device from the range of the service provider, the session will be terminated and the transaction canceled. Thus, a user may not forget to terminate a session since the session will be terminated automatically. Optionally, the user may terminate a session explicitly in a number of situations, such as when the user has completed its interaction with the service provider, when the personal wireless device or user decides not to pass the token to the service provider, or in a number of different circumstances. The invention is not limited to the manner in which the session is terminated.

The type of transaction, type of protocol, and other factors may influence the sensitivity of the session, which will affect how the session is terminated. For example, a session with an ATM may be very sensitive such that moving the PWD several feet from the ATM may cause a drop in signal strength sufficient to terminate the session. A sensitive session may be desirable for transactions that should be terminated when the user moves even slightly away from the machine, such as in connection with high monetary value transactions. Conversely, a session may be made to be relatively robust, with the session configured to be relatively insensitive to connection changes, e.g. due to movement, to allow the user to meander within range of the terminal without affecting the session. For example, a robust session may be desirable where the session caused the user to be logged into a computer network, so that the user can move about the office or to an adjacent work area without causing the session to terminate. Additionally, where a directional transaction is undertaken, such as with the use of infrared as the underlying technology, merely pointing the infrared in a different direction may cause the session to terminate. Many different options are available and the invention is not limited to any particular manner of terminating the session.

Particular transactions may also be configured to require a very close proximity of the personal wireless device to the terminal to enable the transaction to occur. For example, the transmitter power on a vending machine may be set to be very low, so that a person standing in front of a vending machine may only purchase something from the one vending machine closest to them. In this manner, the signal strength may be altered depending on the type of transaction intended by the terminal to reduce the possibility that the user will unintentionally engage in a transaction with an unintended terminal.

Proximity based session management may be advantageously utilized in a number of situations. For example, this type of session management may be used to automatically open a user's car doors when the user approaches the vehicle, and automatically lock the car doors when the user walks away. Similarly, proximity based session management may be used to control the user's status on a computer network. For example, the session management and transmission of a token may result in the user being automatically logged onto the computer network. However, when the user leaves their desk, the session management may cause the user to be logged off of the network or the computer screen to lock while they are away from their desk. Other transactions may be managed the same way, for example the automatic session termination may be used to prevent a user from forgetting to terminate a session with a kiosk or automated teller machine (ATM). The invention is not limited to these several described uses for proximity based session management, as many different applications may be possible.

Figure 3:
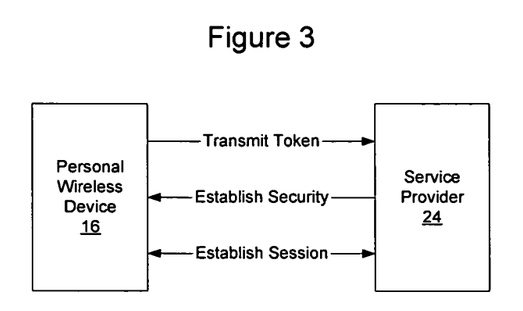
FIG. 3 is a functional block diagram illustrating a process of establishing a communication session between a personal wireless device and a service provider according to an embodiment of the invention.

FIG. 3 illustrates interactions between the personal wireless device and a service provider. As shown in FIG. 3, the personal wireless device initially establishes a session with the service provider using a protocol such as Bluetooth, Infrared, one of the 802.11x protocols, or another short range wireless protocol. Once the session is established, a secure channel is established on the session, such as by using a security protocol such as Secure Socket Layer (SSL). Finally, once the secure channel is established, the token may be transmitted through the secure channel using a protocol such as Security Assertion Markup Language (SAML) over Hyper Text Transfer Protocol (HTTP), although the invention is not limited in this manner. SAML is an extensible markup language (XML) based system that was developed to be used to transmit authentication and authorization information between systems. Other protocols may be used to transfer the token as well and the invention is not limited to the use of SAML over HTTP.

As mentioned above, the federated identity system may be used for more than enabling transactions to take place service providers such as merchants. For example, the federated identity system may be used to create a token based login system to enable a customer to log into a computer system in a secure manner without requiring the customer to enter a user name and password. Specifically, the token provided to the user and stored on the personal wireless device may be passed to the computer system to identify the user to the computer system as an authorized operator on the network.

The federated identity system may also be used in place of conventional keys to unlock or otherwise gain admittance to a building, vehicle, or other restricted area. For example, buildings conventionally have card readers that may be based on RFID technology or resonant circuit technology. Since ID cards can be lost, and a given user may have multiple ID cards or access cards to allow the user to have access to different facilities, this represents a less than ideal way of controlling access to a building. According to an embodiment of the invention, a token reader may be associated with an access to a residential or commercial building, and the federated identity system may be used to identify the person seeking admittance to the building or vehicle in a secure manner.

The federated identity system may also be used to establish the right to enter a particular venue for a particular event. For example, concerts, cultural events, and sporting events routinely require patrons to posses a ticket to enter. The federated identity system may be used to present a token that may be used to obtain an electronic ticket stored at the federated identity provider to verify the patron's right to enter the venue. In this manner, the authorization response from the federated identity provider may include an indication of the patron's right to enter the venue.

The federated identity system may be used to obtain goods or services from a vending machine in a manner described above. Vending machines are commonly used to sell consumable items in various locations. According to an embodiment of the invention, a federated identity system may be used to allow consumers to purchase items from a vending machine in a manner as discussed above.

Figure 4:
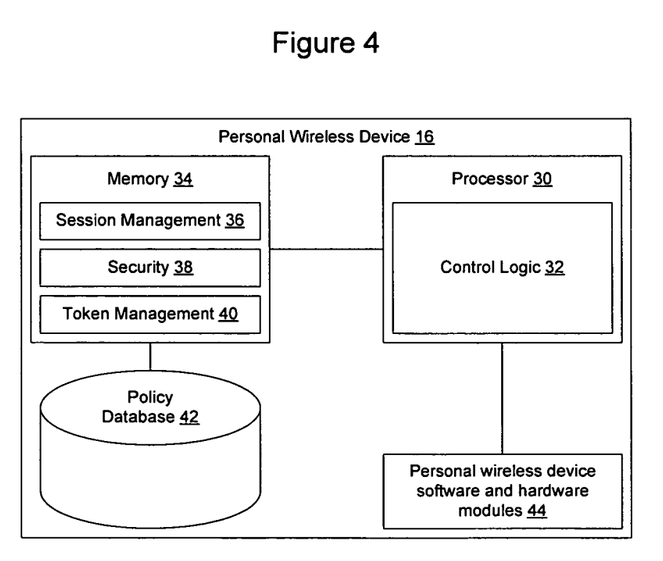
FIG. 4 is a functional block diagram of a personal wireless device configured to support the federated identity-based transactions according to an embodiment of the invention.

FIG. 4 illustrates a personal wireless device configured to support federated identity based transactions according to an embodiment of the invention. As shown in FIG. 4, the personal wireless device includes a processor 30 containing control logic 32 configured to execute software routines to support the transactions. A memory 34 may be provided to store data and instructions to enable the personal wireless device to perform the functions described above. For example, the personal wireless device may include session management software 36 configured to manage sessions with service providers, security software 38 configured to establish secure channels on the sessions and authenticate the service providers, and token management software 40 configured to control how the token is used in connection with transactions, for example by allowing a policy database 42 to be created and used in connection with session management and token management on the personal wireless device. The invention is not limited to the embodiment illustrated in FIG. 4, as numerous other architectures may be used to implement the personal wireless device as well. For example, the network element may also include personal wireless device software and hardware modules 44 configured to enable it to perform other functions commonly associated with a personal wireless device and optionally communicate on the wireless communication network.

It should be understood that all functional statements made herein describing the functions to be performed by the methods of the invention may be performed by software programs implemented utilizing subroutines and other programming techniques known to those of ordinary skill in the art.

The control logic may be implemented as a set of program instructions that are stored in a computer readable memory within the network element and executed on a microprocessor, such as a network processor. However, in this embodiment as with the previous embodiments, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method for performing transactions between a user and a merchant at a same location, the method comprising:
   a personal wireless device authenticating the user of the personal wireless device;
   in response to successful authentication of the user of the personal wireless device, the personal wireless device providing credentials to a federated identity provider to authenticate the personal wireless device with the federated identity provider;
   in response to successful authentication of the personal wireless device after providing the credentials, the personal wireless device receiving a token for the user from the federated identity provider, wherein the token is a temporary token having an expiry;
   the personal wireless establishing a communication session with a merchant located at a first location, wherein the personal wireless device is also located at the first location during the communication session, and wherein the communication session is established using a short range wireless communication protocol; and
   the personal wireless device providing the token to the merchant using the short range wireless communication protocol to purchase goods or services from the merchant.

2. The method of claim 1, wherein the personal wireless device is a cellular telephone.

3. The method of claim 1, wherein said requesting the token and said receiving the token is performed over a first wireless network.

4. The method of claim 3, wherein the first wireless network does not use the short range wireless communication protocol.

5. The method of claim 3, wherein the first wireless network comprises a cellular telephone network.

6. The method of claim 1, wherein the short range wireless communication protocol is Bluetooth.

7. The method of claim 1, wherein the short range wireless communication protocol comprises an 802.11 wireless communication protocol.

8. The method of claim 1, wherein the short range wireless communication protocol comprises an infrared wireless communication protocol.

9. The method of claim 1, wherein said providing the token to the merchant is based on a policy for providing the token.

10. The method of claim 9, wherein the policy comprises a set of rules relating to whether particular service providers or classes of service providers should receive the token automatically, never, or upon direction by the user.

11. The method of claim 1, further comprising:
   the personal wireless device verifying the identity of the merchant.

12. The method of claim 11, wherein said verifying the identity of the merchant comprises obtaining identification information identifying a merchant device associated with the merchant.

13. The method of claim 1, further comprising:
   automatically terminating the communication session with the merchant.

14. The method of claim 13, wherein said automatically terminating the communication session is based on a change in wireless signal characteristics between the personal wireless device and the merchant.

15. The method of claim 1, wherein authenticating the personal wireless device with the federated identity provider is based on authenticating the personal wireless device with a wireless network.

16. The method of claim 1, further comprising:
   the personal wireless device determining whether the merchant is a recognized merchant;
   wherein said providing the token to the merchant is performed based on the personal wireless device determining that the merchant is a recognized merchant.

17. A non-transitory, computer accessible memory medium of a personal wireless device, wherein the memory medium stores program instructions for performing transactions between a user and a merchant at a same location, wherein the program instructions are executable to:
   authenticate the user of the personal wireless device;
   in response to successful authentication of the user of the personal wireless device, provide credentials to a federated identity provider to authenticate the personal wireless device with the federated identity provider;
   in response to successful authentication of the personal wireless device after providing the credentials, receive a token for the user from the federated identity provider, wherein the token is a temporary token having an expiry;
   establish a communication session with a merchant located at a first location, wherein the personal wireless device is also located at the first location during the communication session, and wherein the communication session is established using a short range wireless communication protocol; and provide the token to the merchant using the short range wireless communication protocol to purchase goods or services from the merchant.

18. The non-transitory, computer accessible memory medium of claim 17, wherein said requesting the token and said receiving the token is performed over a first wireless network.

19. The non-transitory, computer accessible memory medium of claim 18, wherein the first wireless network comprises a cellular telephone network.

20. The non-transitory, computer accessible memory medium of claim 17, wherein the short range wireless communication protocol is Bluetooth.

21. The non-transitory, computer accessible memory medium of claim 17, wherein the short range wireless communication protocol comprises an 802.11 wireless communication protocol.

22. The non-transitory, computer accessible memory medium of claim 17, wherein the short range wireless communication protocol comprises an infrared wireless communication protocol.

23. The non-transitory, computer accessible memory medium of claim 17, wherein the program instructions are further executable to:
   determine whether the merchant is a recognized merchant;
   wherein providing the token to the merchant is performed based on the personal wireless device determining that the merchant is a recognized merchant.

24. A personal wireless device, comprising:
   wireless communication circuitry for performing wireless communication over one or more wireless networks;
   logic coupled to the wireless circuitry, wherein the logic is configured to:
      authenticate a user of the personal wireless device;
      in response to successful authentication of the user of the personal wireless device, provide credentials to a federated identity provider to authenticate the personal wireless device with the federated identity provider;
      in response to successful authentication of the personal wireless device after providing the credentials, receive a token for the user from the federated identity provider, wherein the token is a temporary token having an expiry;
      establish a communication session with a merchant located at a first location using the wireless communication circuitry, wherein the personal wireless device is also located at the first location during the communication session, and wherein the communication session is established using a short range wireless communication protocol; and
      provide the token to the merchant using the short range wireless communication protocol to purchase goods or services from the merchant.

25. The personal wireless device of claim 24, wherein the wireless communication circuitry comprises:
   first wireless communication circuitry for performing communication over a first wireless network, wherein said requesting the token and said receiving the token is performed over the first wireless network; and
   short range wireless communication circuitry for performing communication using the short range wireless communication protocol.

26. The personal wireless device of claim 25, wherein the first wireless communication circuitry is configured to perform cellular communication, wherein the first wireless network comprises a cellular telephone network.

27. The personal wireless device of claim 24, wherein the wireless communication circuitry comprises Bluetooth wireless communication circuitry, and wherein the short range wireless communication protocol is Bluetooth.

28. The personal wireless device of claim 24, wherein the wireless communication circuitry comprises 802.11 wireless communication circuitry, wherein the short range wireless communication protocol comprises an 802.11 wireless communication protocol.

29. The personal wireless device of claim 24, wherein the wireless communication circuitry comprises infrared wireless communication circuitry wherein the short range wireless communication protocol comprises an infrared wireless communication protocol.

30. The personal wireless device of claim 24, wherein the logic is configured to:
   determine whether the merchant is a recognized merchant;
   wherein providing the token to the merchant is performed based on the personal wireless device determining that the merchant is a recognized merchant.

* * * * *